United States Patent [19]
Cooke et al.

[11] Patent Number: 5,551,549
[45] Date of Patent: Sep. 3, 1996

[54] FRICTION FACING AND CARRIER ASSEMBLY

[75] Inventors: Richard D. M. Cooke, Warwick; Benjamin C. Struve, Leamington Spa, both of Great Britain

[73] Assignee: Automotive Products, plc, Leamington Spa, England

[21] Appl. No.: 318,683

[22] PCT Filed: Feb. 23, 1994

[86] PCT No.: PCT/GB94/00363

§ 371 Date: Oct. 11, 1994

§ 102(e) Date: Oct. 11, 1994

[87] PCT Pub. No.: WO94/19616

PCT Pub. Date: Sep. 1, 1994

[30] Foreign Application Priority Data

Feb. 27, 1993 [GB] United Kingdom ............... 9304004

[51] Int. Cl.⁶ .................................................. F16D 13/64
[52] U.S. Cl. .................. 192/107 R; 192/107 C
[58] Field of Search .......................... 192/107 R, 107 C; 188/218 X L

[56] References Cited

U.S. PATENT DOCUMENTS

| | | | |
|---|---|---|---|
| 4,821,860 | 4/1989 | Crawford et al. | 192/107 R X |
| 5,076,410 | 12/1991 | Maycock et al. | 192/107 R |
| 5,271,488 | 12/1993 | Cooke et al. | 192/107 R X |

FOREIGN PATENT DOCUMENTS

| | | | |
|---|---|---|---|
| 552387A1 | 7/1993 | European Pat. Off. | 192/107 R |
| 2260168A | 4/1993 | United Kingdom | 192/107 R |

*Primary Examiner*—Andrea L. Pitts
*Attorney, Agent, or Firm*—Paul E. Milliken; Lee A. Germain

[57] ABSTRACT

A friction material facing and carrier assembly (10) for a clutch driven plate in which at least one annular friction facing (20A) is secured to the carrier (11) by stripes (24A, 24B, 24C, 24D) of adhesive elastomeric material which are coaxial with the facing. The carrier plate includes circular rows (15, 16, 17) of perforations (14) and the stripes of adhesive are located on the circular lands (25, 26, 27, 28) either side of and between adjacent rows of perforations. The stripes of adhesive may be joined together to provide a continuous stripe of adhesive which extends from the radially inner margin of the facing to the radially outer margin of the facing.

14 Claims, 3 Drawing Sheets

FRICTION FACING AND CARRIER ASSEMBLY

This invention relates to friction material facing and carrier assemblies particularly for friction clutch driven plates, and to a method of manufacture thereof.

It is known to manufacture a friction clutch driven plate by the use of adhesive to secure an annular friction facing to a support-or carrier plate. In conventional driven plates an epoxy resin based adhesive may be used for this purpose.

It is desirable for the friction facing of a driven plate to have a certain degree of flexibility and axial cushioning. The epoxy resin adhesive film generally provides little or no compliance or cushioning.

The axial cushioning is desired to ameliorate a phenomenon known in the trade as "heat spotting", which leads to localised overheating of high spots on the friction faces of the driven plate, flywheel, or pressure plate. The cushioning also helps to prevent clutch judder on take-up of the drive.

The necessary axial cushioning is generally provided between the opposed back faces of a pair of annular friction facings. This is conventionally achieved by mounting the facings on spring steel cushioning segments. EP0252583A, describes the use of a silicone rubber adhesive for mounting a friction facing onto a carrier or support.

The silicone rubber adhesive serves to secure the facing to its support and also provides the necessary axial cushioning, thus allowing a simplification of the driven plate construction. In WO89/05411 there is disclosed a construction in which the silicone rubber adhesive is formed in discrete concentrically spaced circles. Each circle of adhesive is described as being formed by a respective adhesive nozzle.

In WO91/10842 there is described a friction material facing and carrier assembly for a clutch driven plate, and which comprises at least one annular friction facing secured to the carrier by a plurality of concentric circular stripes of adhesive elastomeric material which are coaxial with the facing, each circular stripe being interrupted at only a single point on the circle to form a gap between the beginning and end of the respective circle, and the interruptions in each circular stripe are radially aligned one with the other, and the end of one circular stripe is joined to the beginning of the adjacent concentric circular stripe so that the adhesive forms a continuous stripe from the radially inner margin of the facing to the radially outer margin of the facing.

The carrier plates described in the above documents each comprise an annular plate with a plurality of radially outwardly extending fingers equiangularly spaced around its outer periphery. Preferably there are thirty fingers but other numbers could be used if desired. The fingers are capable of flexing resiliently to allow axial movement of friction facing mounted thereon, the friction facing being somewhat flexible to allow small amounts of axial deformation.

In order to improve the burst strength of the driven plate the applicant has devised a new friction material and facing carrier.

According to the invention a friction material facing and carrier assembly for a clutch driven plate, and which comprises at least one annular friction facing secured to the carrier by stripes of adhesive elastomeric material which are coaxial with the facing, characterised in that the carrier plate has a plurality of perforations therein arranged in different diameter circular rows, and the stripes of adhesive are located on the circular lands either side of and between adjacent rows of perforations.

The invention will be described by way of example and with the reference to the accompanying drawings in which.

Figure 1:
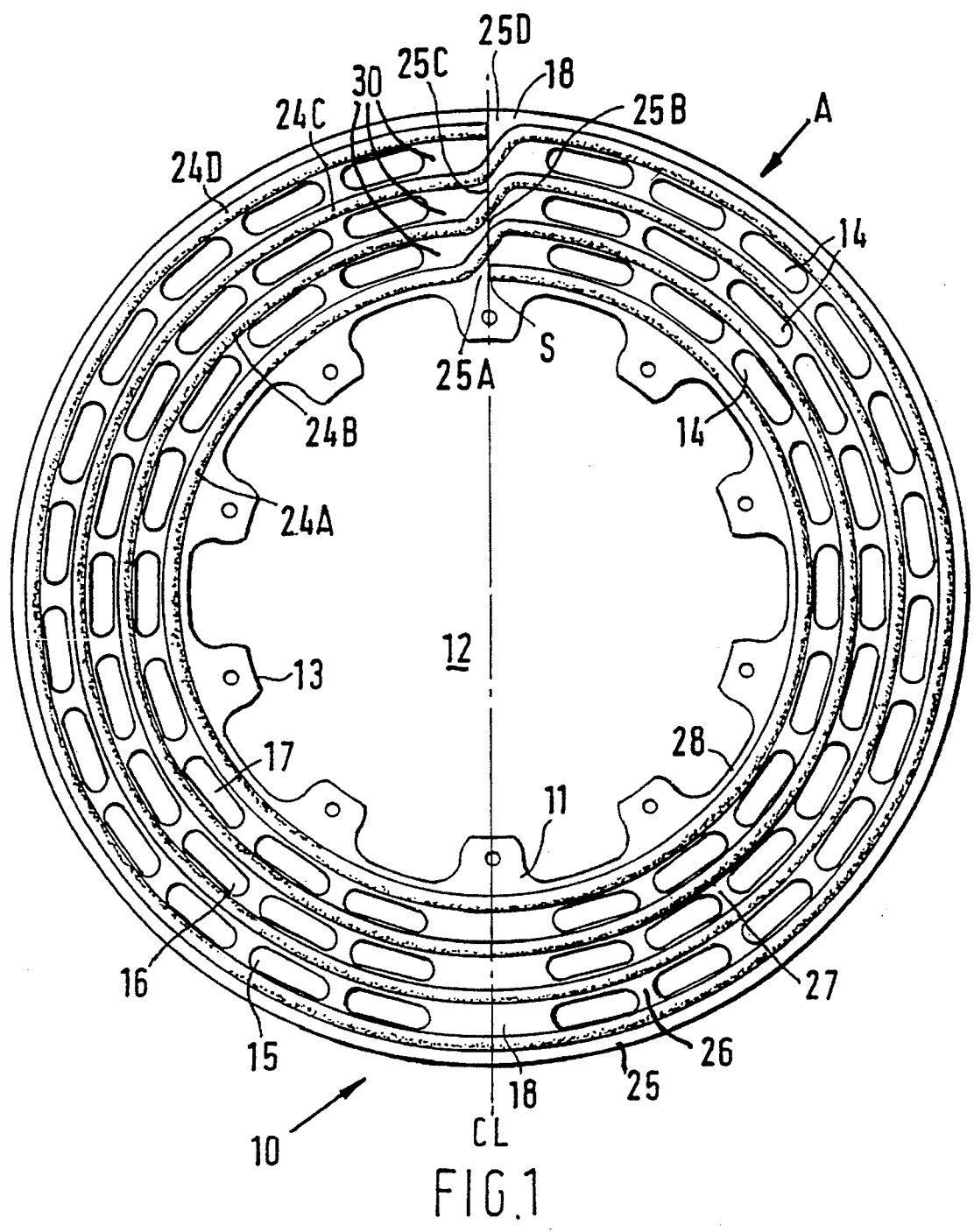
FIG. 1 is an illustration of a friction material facing carrier according to the invention.
Figure 2:
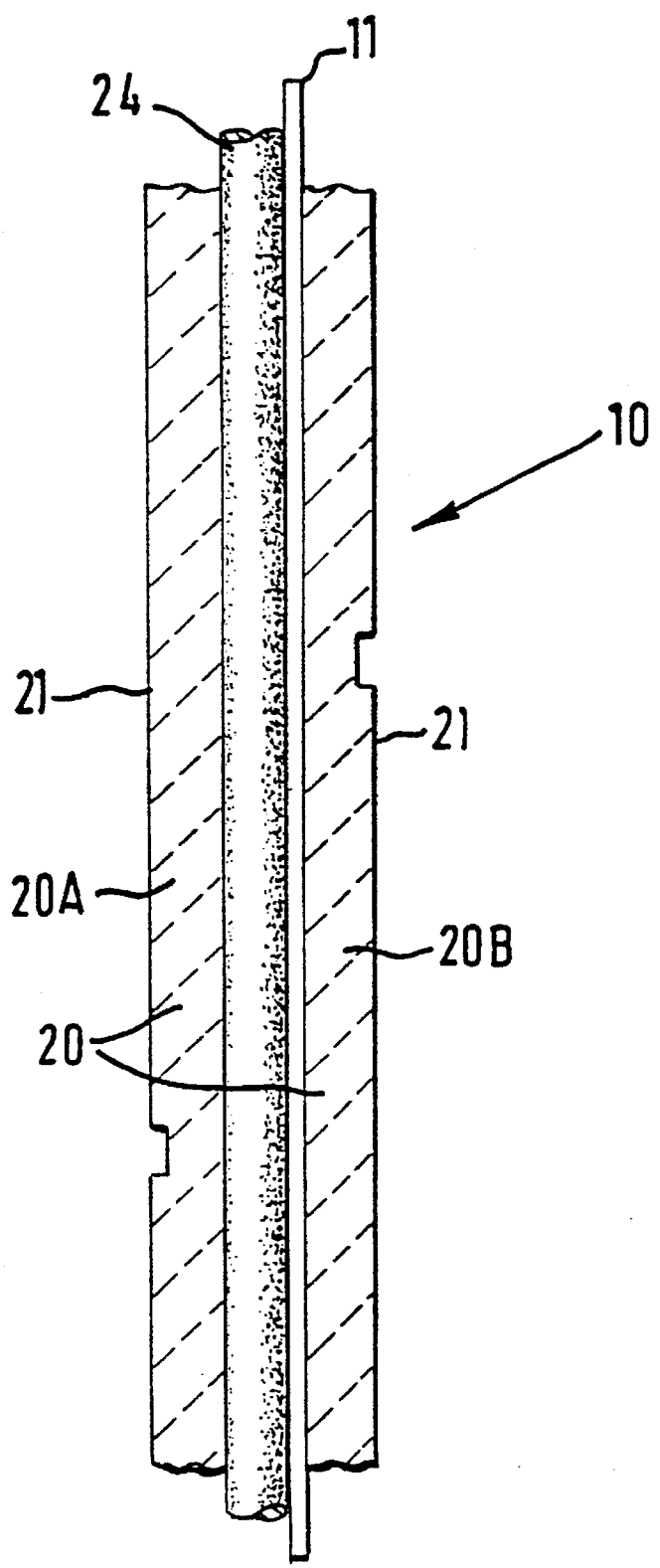
FIG. 2 is a view in the direction of arrow A in FIG. 1 showing the facing carrier with two friction facings thereon.

With reference to FIGS. 1 and 2, there is illustrated a friction material facing and carrier assembly 10 which is intended to form part of a friction clutch driven plate for a motor vehicle, preferably a motor car. The assembly 10 comprises a steel annular carrier plate 11 having a centre hole 12 for mounting of the plate 11 onto a driven plate hub (not shown). The carrier plate 11 is formed with radially inwardly projecting lugs 13 for attachment to the hub centre (not shown).

The carrier plate 11 has a plurality of radially spaced circular rows 15, 16, 17 of perforations 14 with continuous circular lands 25, 26, 27, 28 located either side and between the rows of perforations. In each row 15, 15, and 17 the perforations 14 are equiangularly spaced around the plate 11 for each half of the plate on either side of a centre line CL. The two halves of the plate are separatd by circumferentially extending lands 18 located on the centre line CL. Preferably there are different numbers of perforations 14 in the different circular rows, there being a small number (eighteen) in the radially inner row 17 and the numbers increase as the rows are located radially outwardly such that there are twenty two in the middle row 18 and twenty four in the outer row 15. The perforations 14 in the rows are angularly offset from each other. This arrangement allows for axial movement of a friction facing 20 mounted thereon, the friction facing 20 being somewhat flexible to allow small amounts of axial deformation, but with a maximum contact area for the adhesive.

The perforations 14 are all substantially identical round ended elongated holes.

The carrier plate 11 preferably has two coaxial friction facings 20 mounted thereon one facing 20 on each axial side of the carrier plate 11 with the friction surfaces 21 oppositely directed.

The facings 20 are mounted on the carrier plate 11 by use of an adhesive material which is laid onto the back face 18 of each facing 20 to adhere the respective facing to the carrier plate 11.

At least one of the facings 20A is secured to the carrier plate 11 by use of an elastomeric adhesive material 24, preferably a silicone rubber such as RTV7057 sold by Dow Corning, or Elastosil E14 produced by Waker-Chemie Gmbh, or RTV159 produce by the General Electric Company of the USA.

The silicone rubber can withstand temperatures of upto 250–300 C and is sufficiently flexible to provide cushioning between the friction facings 20.

For a better understanding of the relationship between the resilience of the silicone: rubber, the clutch driven plate clamp loads, and the flexibility of the friction facings the reader is directed to the present applicants published European Patent application 0252583A1.

On said one facing 20A, the elastomeric adhesive 24 is laid in coaxial concentric circular stripes or beads 24A, 24B, 24C and 24D which are shown superimposed on the carrier plate in FIG. 1 and which are laid to coincide with the lands 28, 27, 26, 25 respectively. The concentric circular stripes 24A, 24B, 24C and 24D are evenly radially spaced as shown, or these spacings can be varied as desired.

In the preferred embodiment of the invention shown in FIG. 2, one friction facing 20A is secured to the carrier 11 by silicone rubber adhesive, and the other facing 20B is secured to the carrier plate by a rigid adhesive of the epoxide type. The webs between adjacent perforations 15, 16, 17, allow the facing 20 to flex.

There are four coaxial concentric circular stripes 24A, 24B, 24C and 24D and each circular stripe is interrupted at a single point in the circle to form a gap 25A, 25B, 25C, 25D between the beginning and end of the respective circle of adhesive.

The laying of the adhesive onto the friction facing begins at the point 'S' on the radially inner margin and as the first circle of adhesive 24A is almost completed the adhesive stripe is displaced radially outwardly to the next adjacent circle 24B and so on until the desired number of turns or circles of adhesive have been laid onto the facing and the adhesive stripe 24 is at the outer margin of the facing. There is therefore a continuous bead of adhesive from the inner margin to the outer margin of the facing. A gap 25D is also left in the last turn 24D on the outer periphery of the facing 20 so that there is a continuous passageway from the inner periphery to the outer periphery of the facing. This passageway 30 allows for the removal of gases emitted by single pack silicone rubbers during their curing processes.

The gaps 25A, 25B 25C and 25D are substantially radially aligned since the radial displacements of the adhesive stripe 24 occur at the same angular location for each circle, and occur at one off the sets of lands 18 on the centre line CL between the two halves of the circular plate.

The bead or stripe 24 of adhesive may be given a slightly sinusoidal form as shown to increase its contact area.

Alternatively the adhesive stripe 24 can begin at the outer margin of the facing and the nozzle be moved radially inwardly as required.

The elastomeric adhesive can be applied to the respective friction facing by extruding the elastomeric adhesive through a nozzle and by simultaneously causing relative circular movement between the nozzle and the facings to apply a circular stripe or bead or adhesive to the back surface of the facing, and then just before the circle is complete, relatively displacing the nozzle radially and repeating the relative rotation and displacement operations until the desired number of circles of adhesive have been laid.

The extrusion of adhesive is stopped on the last circle so as to leave the gap 25A in outer circular stripe 24A. This will produce an adhesive pattern similar to that shown in 1.

The stripe can be given a sinusoidal form by slight relative sideways movement of the nozzle during the relative rotation.

Preferably the facing is held stationary and the nozzle is moved relative to the facing to lay the adhesive material stripe onto the facing. The nozzle is moved at a substantially constant linear speed to lay a stripe of substantially constant cross-section. However, the cross-sectional area of the extrudate adhesive can be altered as desired by varying the extrusion speed of the adhesive or the linear speed of the nozzle.

The adhesive laying process is started at the radially inner margin of the facing 20 and is moved radially outwardly by the relative radial displacements of the nozzle, or may be started at the outer margin and moved inwardly as previously discussed.

Once the desired pattern of elastomeric adhesive materials has been laid on the back face of the facing, the facing can be mounted onto carrier plate 11. The facing 20 must be held flat as the carrier plate 11 is pressed into contact with the adhesive, and location means must be provided to prevent the adhesive from being squeezed out of shape.

A suitable method and apparatus is described in Published British Patent 2220997.

An appropriate passage of time must be allowed for full cure of the adhesive. For example, a single pack silicone rubber RTV7057 will take about 48 hours to cure at room temperature with a humidity of 50%.

Figure 3:
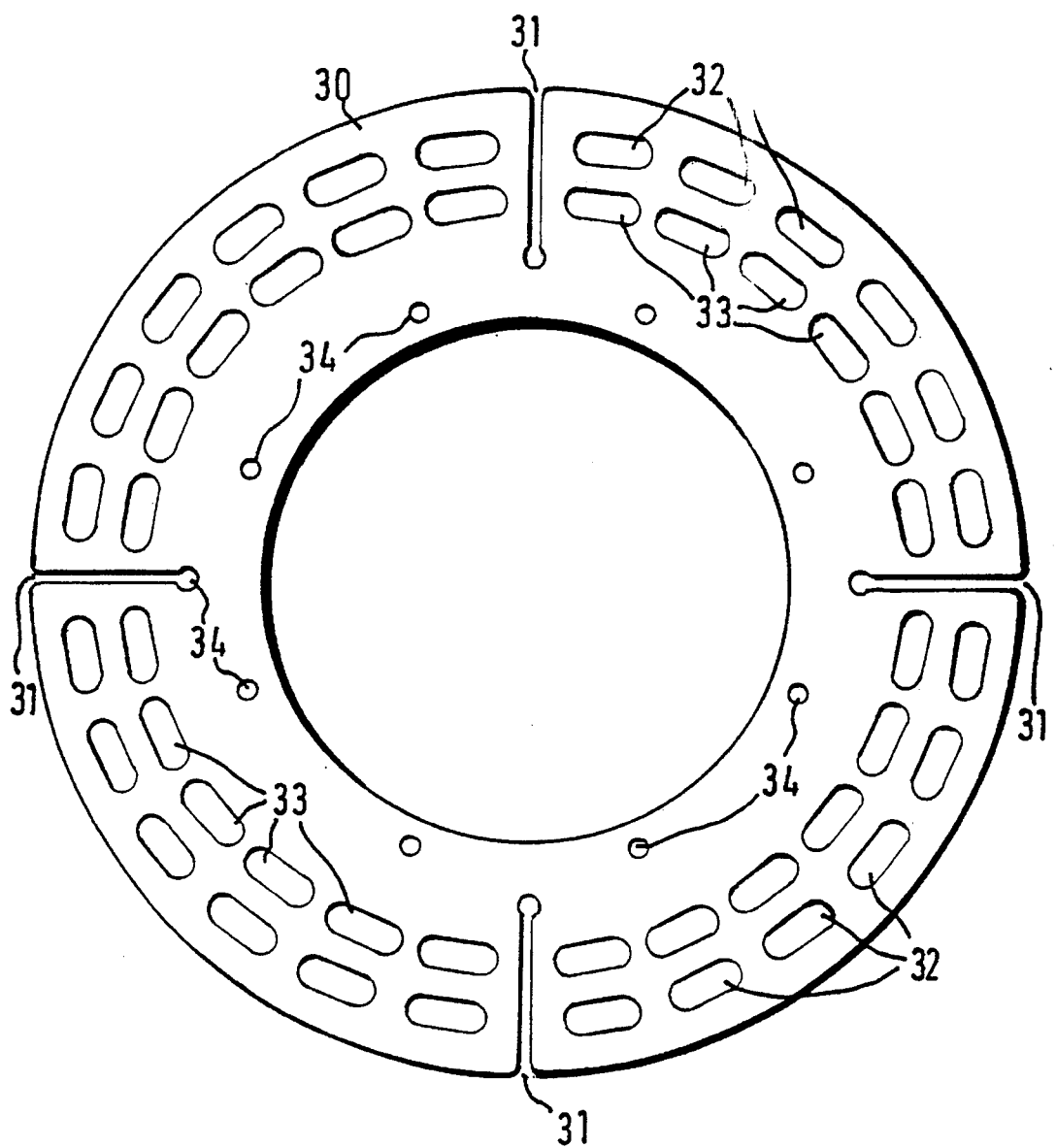
FIG. 3 shows a further form of friction material facing carrier according to the invention.

FIG. 3 shows a further form of carrier plate 30 provided with four circumferentially spaced radially extending slots 31 and two circular rows 32 and 33 of perforations. The slots divide the rows of perforations into four arcs of perforations with equal numbers of perforations in each arc and improve the axial flexibility of the carrier. Attachment holes 34 are provided adjacent the inner periphery of the carrier plate 30 for attachment of the carrier to a hub centre (not shown).

Although FIG. 3 shows only two rows of perforations three or more rows of perforations could be used.

The friction facing (not shown) is bonded to the carrier plate 30 by stripes of elastomeric adhesive (not shown) between and on either side of the rows of perforations. For example, when two rows of perforations are provided there will be three circular stripes of adhesive one outboard of row 32, one between rows 32 and 33 and one inboard of row 33. These sripes can be applied as a continuous stripe, as shown in FIG. 1, with the circles of stripes being joined over one of the radial slots. Alternatively the joins between the circular stripes of adhesive can be located at any convenient circumferential position on the carrier and could be located over one or more of the perforations.

We claim:

1. A friction material facing and carrier assembly (10) for a clutch driven plate, which comprises at least a first annular friction facing (20A) secured to a first side of a carrier plate (11) by stripes (24A, 24B, 24C, 24D) of adhesive elastomeric material which are coaxial with the facing, characterised in that the carrier plate has a plurality of perforations (14) therein arranged in different diameter circular rows (15, 16, 17) with circumferentially extending lands on both radially inner and outer sides thereof, and the stripes of adhesive are located on each circular lands (25, 26, 27, 28) radially inside and outside each row of perforations.

2. An assembly as claimed in claim 1 characterised in that the perforations (14) in each circular row are circumferentially staggered with respect to perforations in an adjacent row.

3. An assembly as claimed in claim 1 characterised in that the adhesive stripes (24A, 24B, 24C, 24D) are arranged in substantially concentric circles.

4. An assembly as claimed in claim 3 characterised in that each circular stripe (24A, 24B, 24C, 24D) has an interruption (25A, 25B, 25C, 25D) therein at a single point on the circle to form a gap between the beginning and end of each circle and the end of one circular stripe is joined to the beginning of the adjacent concentric circular stripe so that the adhesive forms a continuous stripe from a radially inner margin of the facing to a radially outer margin of the facing.

5. An assembly as claimed in claim 1 characterised in that the carrier plate (11) is symmetrical about a centre line (CL) and the perforations (14) each circular row (15, 16, 17) are separated into two groups located each side of the centre line with the two groups separated by circumferentially elongated lands (18) located on the centre line.

6. An assembly as claimed in claim 5 characterised in that each circular stripe (24A, 24B, 24C, 24D) has an interruption (24A, 25B, 25C, 25D) therein at a single point on the circle to form a gap between the beginning and end of each circle and the end of one circular stripe is joined to the beginning of the adjacent concentric circular stripe so that the adhesive forms a continuous stripe from the radially inner margin of the facing to the radially outer margin of the facing.

7. An assembly as claimed in claim 6 characterised in that the interruption (25A, 24B, 25C, 25D) in each stripe is located on said centre line (CL) in alignment with the circumferentially elongated lands (18).

8. An assembly as claimed in claim 1 characterised in that the carrier plate is provided with a plurality of circumferentially spaced radially extending slots which divide the circular rows of perforations into arcs of perforations.

9. An assembly as claimed in claim 8 characterised in that there are four radially extending slots with equal numbers of perforations in the four arcs of perforations between the slots.

10. An assembly as claimed in claim 1 characterised in that the circular rows (15, 16, 17) of perforations (14) are spaced radially apart by substantially the same distance.

11. An assembly as claimed in claim 1 characterised in that the circular rows (15, 16, 17) of perforations (14) each contain different numbers of perforations.

12. An assembly as claimed in claim 1 characterised in that the elastomeric material is a silicone rubber adhesive.

13. An assembly as claimed in claim 1, characterised in that said second facing (20B) is secured to the carrier plate (11) by a different adhesive which is a rigid adhesive.

14. An assembly as claimed in claim 1 characterised in that a second annular friction facing (20B) is arranged coaxially with the first annular friction facing (20A) and adhered to a second side of the carrier plate (11).

* * * * *